United States Patent
Borup et al.

(10) Patent No.: US 6,521,204 B1
(45) Date of Patent: Feb. 18, 2003

(54) METHOD FOR OPERATING A COMBINATION PARTIAL OXIDATION AND STEAM REFORMING FUEL PROCESSOR

(75) Inventors: Rodney L. Borup, Los Alamos, NM (US); William H. Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 139 days.

(21) Appl. No.: 09/626,553

(22) Filed: Jul. 27, 2000

(51) Int. Cl.$^7$ .............................. H01M 8/04; C01B 3/26
(52) U.S. Cl. .................... 423/652; 423/651; 429/17
(58) Field of Search .......................... 423/650, 651, 423/652; 252/373; 429/17

(56) References Cited

U.S. PATENT DOCUMENTS

| | | | |
|---|---|---|---|
| 4,293,315 A | | 10/1981 | Sederquist |
| 4,642,272 A | | 2/1987 | Sederquist |
| 4,650,727 A | | 3/1987 | Vanderborgh et al. |
| 4,659,634 A | | 4/1987 | Struthers |
| 4,670,359 A | | 6/1987 | Beshty et al. |
| 4,816,353 A | | 3/1989 | Wertheim et al. |
| 5,271,916 A | | 12/1993 | Vanderborgh et al. |
| 5,484,577 A | | 1/1996 | Buswell et al. |
| 5,741,474 A | * | 4/1998 | Isomura et al. ............. 423/652 |
| 6,083,425 A | * | 7/2000 | Clawson et al. ............ 423/652 |
| 6,254,807 B1 | * | 7/2001 | Schmidt et al. ............ 423/652 |
| 6,268,075 B1 | * | 7/2001 | Autenrieth et al. |
| 6,294,149 B1 | * | 9/2001 | Autenrieth et al. ......... 423/652 |
| 6,383,468 B1 | * | 5/2002 | Schussler et al. ........... 423/651 |

FOREIGN PATENT DOCUMENTS

WO    WO 98/08771    3/1998

OTHER PUBLICATIONS

Hall et al., "A Porous Media Burner for Reforming Methanol for Fuel Cell Powered Electric Vehicles," SAE Paper #950095. (No Date).

Natural Gas Power Plant System (a descriptive drawing). (No Date).

* cited by examiner

*Primary Examiner*—Wayne A. Langel
(74) *Attorney, Agent, or Firm*—Karl F. Barr, Jr.; Cary W. Brooks; Linda M. Deschere

(57) ABSTRACT

In one aspect, the present invention provides a method for operating a fuel cell system. The system comprises a reactor having one or more catalytic beds and is fed a hydrocarbon fuel along with air and steam. Where more than one catalytic bed is present, such catalytic beds are preferably arranged sequentially such that the outlet from one bed enters the inlet of the next bed. The catalytic beds are the regions where reactions among the hydrocarbon, air, and steam are catalyzed within the reactor. The method comprises supplying a stream of a fuel and air mixture to the reactor which is lean. The mixture is lean in that it has an excess amount of oxygen relative to the stoichiometric amount required for reaction with the fuel. The reactions occurring with the lean mixture heat the reactor. When there is more than one catalytic bed, the hot gases generated from one catalytic bed can be used to heat other catalytic beds. After sufficient heating of the reactor by the lean mixture, a fuel-rich stream is fed to the reactor. This fuel-rich mixture comprises fuel, air, and water in the form of steam. The mixture is rich in that fuel is fed in an excess amount relative to the amount of oxygen for a stoichiometric reaction. The reactions of the fuel-rich stream produce a product comprising hydrogen ($H_2$).

10 Claims, 4 Drawing Sheets

METHOD FOR OPERATING A COMBINATION PARTIAL OXIDATION AND STEAM REFORMING FUEL PROCESSOR

FILED OF THE INVENTION

This invention relates to a method for operating a combination partial oxidation and steam reforming fuel processor.

BACKGROUND OF THE INVENTION

Fuel cells have been used as a power source in many applications. Fuel cells have also been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a "membrane electrode assembly" (MEA) comprising a thin, proton transmissive, non-electrically conductive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution of the fuel cell's gaseous reactants over the surfaces of the respective anode and cathode catalysts. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation, assignee of the present invention, and having as inventors Swathirajan et al. A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture primarily containing $O_2$ and $N_2$) The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies which comprise the catalyzed electrodes, are relatively expensive to manufacture and require certain controlled conditions in order to prevent degradation thereof.

For vehicular applications, it is desirable to use a liquid fuel, such as methanol (MeOH), gasoline, diesel, and the like, as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within the primary reactor of the fuel processor. The primary reactor has a catalyst mass and yields a reformate gas comprising primarily hydrogen and carbon dioxide. A conventional exemplary process is the steam methanol reformation process where methanol and water (as steam) are ideally reacted to generate hydrogen and carbon dioxide according to this reaction:
$$CH_3OH+H_2O \rightarrow CO_2+3H_2.$$

Fuel cell systems which process a hydrocarbon fuel to produce a hydrogen-rich reformate for consumption by PEM fuel cells are known and are described in co-pending U.S. patent application Ser. No. 08/975,422 (U.S. Pat. No. 6,232,005) and Ser. No. 08/980,087 (U.S. Pat. No. 6,077,620), filed in the name of William Pettit in November, 1997, and U.S. Ser. No. 09/187,125 (U.S. Pat. No. 6,238,815) Glenn W. Skala et al., filed Nov. 5, 1998, and each assigned to General Motors Corporation, assignee of the present invention. In U.S. Pat. No, 4,650,722, issued Mar. 17, 1987, Vanderborgh et al. describe a fuel processor comprising a catalyst chamber encompassed by combustion chamber. The combustion chamber is in indirect heat transfer relationship with the catalyst chamber and the hydrocarbon is being reformed in the presence of the catalyst.

The indirect heat transfer arrangement between the combustion chamber and catalyst chamber results in extensive time required to heat the catalyst bed to a temperature suitable for fuel reformation. Often, a catalyst regenerating cycle is required to restore the properties of the catalyst after periods of reformation. Therefore, it is desirable to have a method which provides rapid heating of the catalyst beds and timely regeneration of such beds in a reformer.

SUMMARY OF THE INVENTION

In one aspect, the invention provides a method for operating a fuel cell system. The system comprises a reactor having one or more catalytic beds and is fed a hydrocarbon fuel along with air and steam. Where more than one catalytic bed is present, such catalytic beds are preferably arranged sequentially such that the outlet from one bed enters the inlet of the next bed. The catalytic beds are the regions where reactions among the hydrocarbon, air, and steam are catalyzed within the reactor. The method comprises supplying a stream of a fuel and air mixture to the reactor which is lean. The mixture is lean in that it has an excess amount of oxygen relative to the stoichiometric amount required for reaction with the fuel. The reactions occurring with the lean mixture heat the reactor. When there is more than one catalytic bed, the hot gases generated from one catalytic bed can be used to heat other or subsequent catalytic beds. When a single bed is used, the hot gases generated at an upstream end of the bed heat the downstream portion(s) of the bed. After sufficient heating of the reactor by the lean mixture, a fuel-rich stream is fed to the reactor. This fuel-rich mixture comprises fuel, air, and water in the form of steam. The mixture is rich in that fuel is fed in an excess amount relative to the amount of oxygen for a stoichiometric reaction. The reactions of the fuel-rich stream produce a product comprising hydrogen ($H_2$). Other typical components of the product stream are carbon dioxide, carbon monoxide, nitrogen, water, and methane.

In another aspect, following the lean fuel-air mixture, a steam stream is fed to the reactor to purge the reactor. Subsequent to the purge, a fuel-rich fuel and air mixture is fed to the reactor along with steam. In one preferred aspect, the first catalytic bed preferentially oxidizes the fuel with oxygen in the fuel/air mixture. The second catalytic bed provides for further reaction and preferentially catalyzes the products from the first catalytic bed with steam for the production of a product comprising hydrogen and other components. In the case where a single bed is used, three main reactions, partial oxidation, steam reforming and high temperature shift occur in the same bed. The regions of the bed over which such reactions occur typically overlap and change with changing power levels.

One of the advantages of this method is the prevention of, or reduction of, carbon formation. Carbon formation tends to degrade the catalyst on the catalytic beds and decrease the reactor's operating life. Carbon formation also plugs the reactor and decreases flow through one or more of the catalytic beds.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
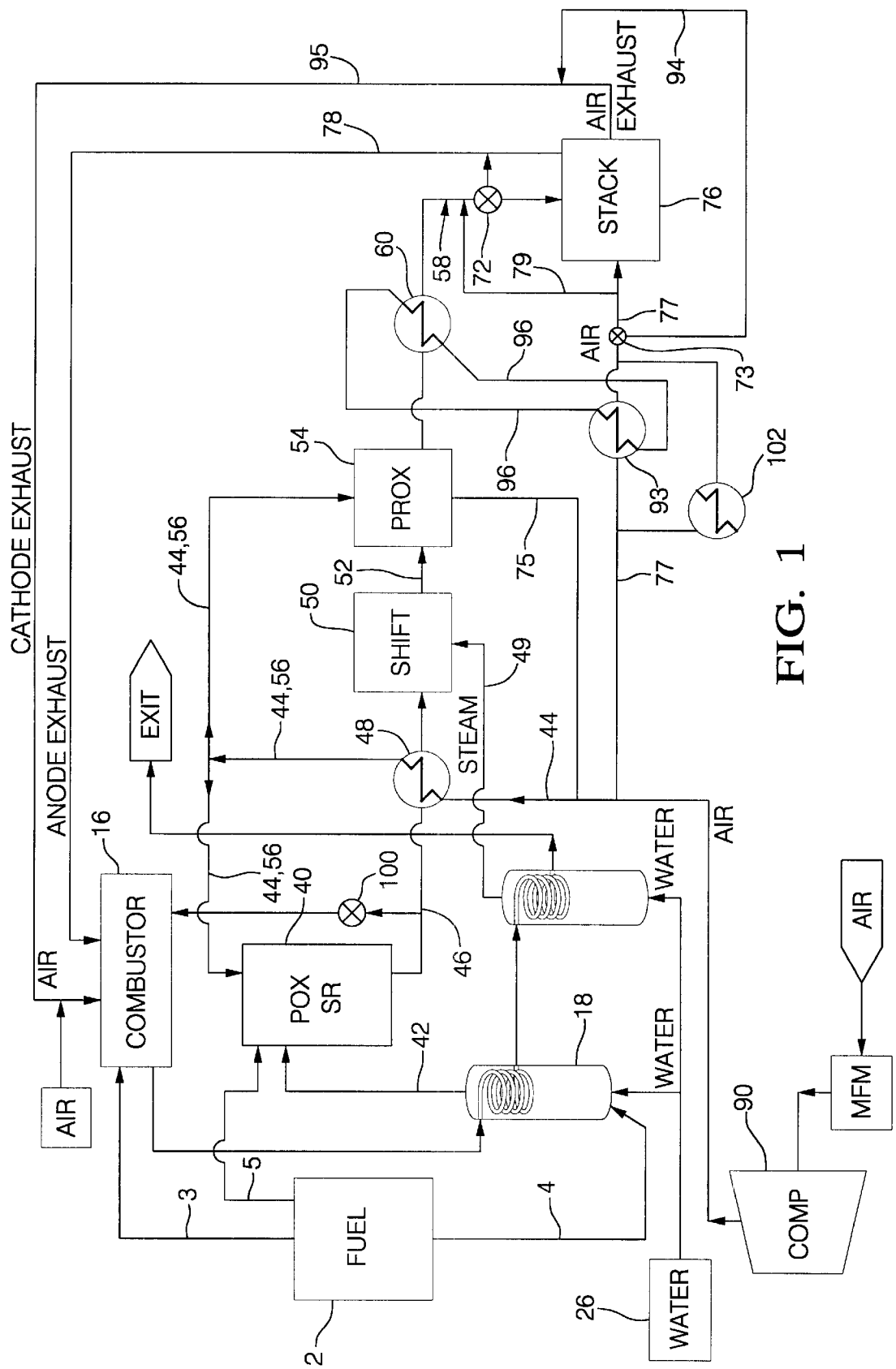
FIG. 1 is a flow diagram depicting a fuel cell apparatus which includes an autothermal reformer constructed and operated according to the invention.

A preferred system to convert hydrocarbons such as gasoline into a hydrogen-rich stream is shown in FIG. 1. A fuel tank 2 supplies ambient temperature liquid fuel such as gasoline to the fuel cell system through fuel supply line 4 which delivers liquid fuel to a heated vaporizer 18 where the liquid fuel is converted to a gas. Fuel tank 2 also supplies fuel to a combustor via line 3. In addition, fuel from fuel tank 2 is supplied through vaporizer 18 and line 42 to an autothermal reformer 40. In another embodiment, liquid fuel is supplied through line 5 to the fuel cell system.

Water from tank 26 is also supplied into vaporizer 18. The heater/vaporizer 18 causes both the fuel and water to vaporize therein and provides both steam and fuel vapor to the autothermal reformer 40 via line 42. The temperature of the steam/fuel mixture is between about 100° C. and 600° C. In another embodiment, the water and fuel vaporizers are separate.

In the exemplary and preferred autothermal reformer 40, the moist fuel and water vapor is mixed with air from line 44 and passes sequentially through two reaction sections. A first section is designated a partial oxidation (POX) section. The second section is designated a steam reforming (SR) section. It should be understood that there is some overlap in the type of reactions occurring in the POX and SR sections. POX implies predominantly reaction between fuel and air and SR implies predominantly reaction between fuel and water. The invention is described herein with reference to these predominant reactions, however, it is to be understood that since fuel, water (steam) and air are added together the POX and SR combined perform as an autothermal reactor. In an autothermal reactor, the predominantly POX reactions are exothermic and the predominantly SR reactions are endothermic, so that as much as possible or all of the heat generated in the POX is carried into the SR. In the POX section, the fuel reacts exothermally with a sub-stoichiometric amount of air to produce carbon monoxide, hydrogen and lower hydrocarbons such as methane. The reaction in the POX section is fuel-rich. The hot POX reaction products, along with steam introduced with the fuel, pass into the SR section where the lower hydrocarbons react with steam to produce a reformate gas comprising principally carbon dioxide, carbon monoxide, hydrogen, nitrogen, water, and methane. The steam reforming reaction is endothermic. Heat required for this endothermic reaction is provided from the heat that is generated by the exothermic POX reaction and is carried forward into the SR section by the POX section effluent. Reformate exits the reformer 40 via line 46 and is cooled by heat exchanger 48. The heat exchanger 48 concurrently preheats air supplied via lines 44 to provide heated air in line 56 which is fed into the autothermal reactor 40. Reformate exiting the heat exchanger 48 enters a catalytic water gas shift reactor 50 and therein reacts with steam supplied through line 49 to produce carbon dioxide and hydrogen from the carbon monoxide and water. Herein, the term reformer 40 refers to autothermal reformer 40.

The shift reactor includes one or more sections (not shown). In one embodiment, there is provided a high temperature shift section and a low temperature shift section. Preferably, cooling of the reformate stream occurs between the high temperature and the low temperature sections. Reformate exiting the shift reactor 50 via line 52 enters a preferential oxidation PROX reactor 54 where it is catalytically reacted with oxygen in either heated air supplied through line 56 or unheated air supplied through line 75. This reaction is conducted to consume essentially all of, or at least most of, the residual carbon monoxide without consuming excess quantities of hydrogen in PROX reactor 54. The air supplied through line 56 comes indirectly from compressor 90 via heat exchanger 48 that preheats the air to a temperature desired, up to 800° C. for reformer 40, depending on operational conditions. The PROX air is supplied through lines 56 and/or 75 to deliver air preferably at an average temperature of about 200° C. to a PROX inlet plenum. In an alternative embodiment, PROX air supply is not preheated and is supplied through line 75. The desired PROX air inlet temperature will depend on system conditions. It may be desirable to not preheat or even to cool the PROX air supply.

PROX effluent exits the PROX reactor 54 via line 58 and is cooled by heat exchanger 60 to a temperature suitable for use in fuel cell stack 76. Cooling is preferably conducted to a temperature below about 100° C. If desired, air in line 77 is preheated in heat exchanger 93 by heat exchange fluid in line 96. Thus, in one embodiment, fluid in line 96 accepts heat rejected by PROX effluent in exchanger 60 and delivers it to air in line 77 via exchanger 93.

As mentioned earlier, in the case where a single bed is used, three main reactions zones are identifiable, a partial oxidation zone, a steam reforming zone, and a high temperature shift zone, each of which may occur utilizing the same catalytic bed. The regions of the bed over which such reactions occur typically overlap and change with changing power levels. For example, at low power level, the partial oxidation typically takes place at the very leading edge of the catalytic bed and the downstream portion of the bed is reforming. A still further downstream portion of the bed catalyzes a high temperature shift reaction. At full power in one embodiment, the catalytic bed is designed to accomplish partial oxidation and steam reforming. In a down turn situation, the downstream or back end of the bed will perform as a high temperature shift. This is a natural design consequence since in a turn down situation all the capacities of the bed will not be required for reforming. In short, as compared to a full power condition, the partial oxidation section will be relatively shortened and the high temperature shift section will be relatively larger, in the autothermal reformer 40.

Exemplary reaction temperatures of the process can be found in the literature, and by way of background are provided here as a teaching tool. The autothermal reformer reactions are conducted at a temperature of about 600° C. to 1000° C.; the high temperature shift at a temperature in the range of 300 to 600° C.; the low temperature shift at a temperature below 300° C.; the PROX at a temperature less than the shift; and the fuel cell at a temperature less than the PROX and suitable for the delicate MEA components.

Air supplied through line 77 is reacted in fuel cell stack 76 with reformate exiting the PROX. The reformate is supplied through line 58 to the fuel cell stack 76. In fuel cell stack 76, the hydrogen-rich reformate in line 58 reacts with air supplied through line 77 in an electrochemical reaction in the presence of the catalyst whereby electrical energy is produced and water is generated as a by-product of the reaction.

If desired, a small amount of air from line 77 is diverted to line 58 reformate via line 79 to help mitigate the effects of any carbon monoxide contamination of the catalyst in fuel cell stack 76. The reformate in stream 58 enters fuel cell stack for reaction and then exits the stack as an anode tailgas or exhaust via line 78. The anode tailgas exiting stack 76 via line 78 is fed to combustor 16 where it is consumed to produce heat. A diverter valve 72 is located in line 58 that supplies the stack and is used to divert the reformate exiting the PROX away from fuel cell stack 76 when required, such as during start-up. The diverter valve 72 reroutes PROX effluent (reformate) into line 78. Air in line 77 may likewise be diverted using valve 73.

Preferably, air is admitted to the system via a mass flow meter (MFM) and is compressed via compressor 90. In one embodiment, air supply from line 44 is cooled in exchanger 102 before being supplied as the oxidant to the fuel cell through line 77. Air supplied through line 77 to the stack which is not completely consumed in the stack exits the stack as cathode exhaust in line 95 where it is supplied to the combustor. A diverter valve 73 is located in air line 77 so that air in line 77 is able to be directed around stack 76 through line 94 and to line 95. Thus, air and reformate are routed around stack 76 via diverters 72 and 73 as needed.

Figure 2:
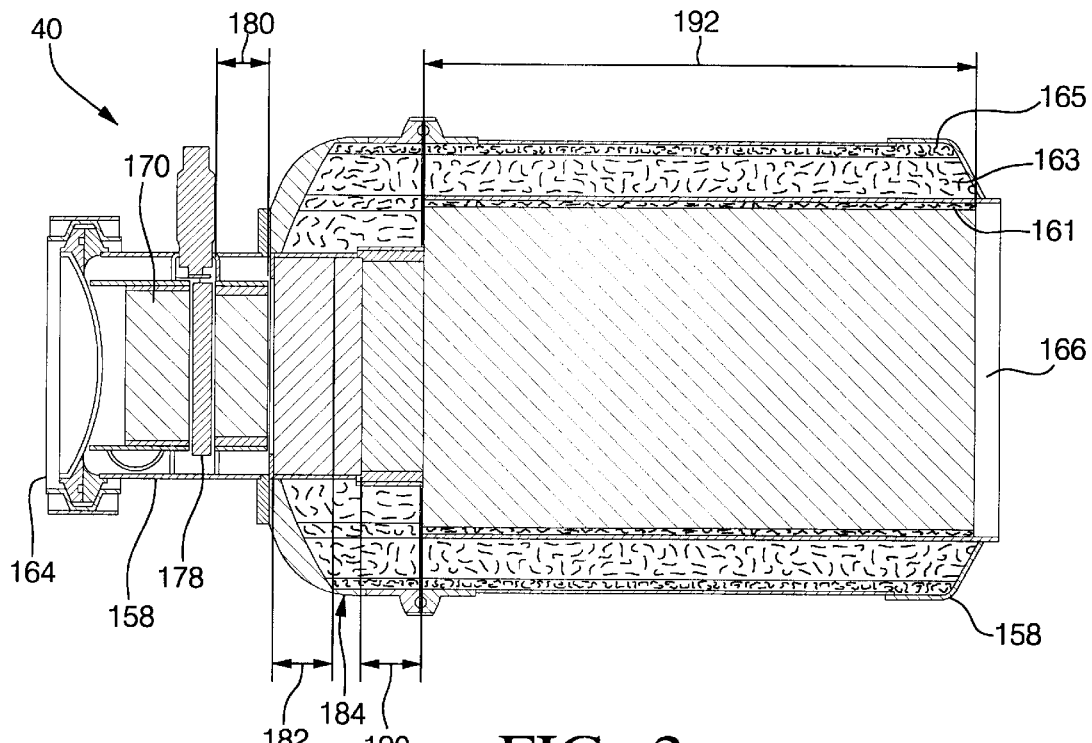
FIG. 2 is a sectioned side view of an autothermal reformer in accordance with the invention.

FIG. 2 is a side sectional view of a preferred autothermal reformer 40 which comprises POX and steam reforming sections. The autothermal reformer 40 comprises a metal housing 158 which is lined with several layers of insulation 161, 163 and 165. A mat insulating material comprises vermiculite. The autothermal reformer 40 has an input end 164 for receiving fuel and air during start-up and for receiving steam/fuel and air mixture during operation of the fuel cell system after start-up. The autothermal reformer 40 has an outlet end 166 through which hot combustion exhaust gases are discharged during start-up (warm-up) before normal operation of the fuel cell system. Outlet end 166 serves to supply reformate stream 46 to the downstream shift reactor 50 during normal operation of the system when steam, fuel and air are being supplied during normal production of reformate. The outlet end 166 comprises suitable mounting and adaptors (not shown) for supplying reformate downstream to the shift reactor 50 and for discharging combustion exhaust gases during the warm-up cycle. A first bed of gas mixing and distribution foam 170 is positioned adjacent input end 164. This section 170 preferably comprises a ceramic foam type media to act as a homogenization region for homogenizing the mixture entering the autothermal reformer. Mixing or homogenization of the fuel and air during lean burn start-up occurs in this region. During normal operation, steam/fuel and air are mixed in this region. Preferred mixing and gas distribution media comprise ceramic foams having a porosity profile of about 25 to 80 pores per linear inch, but other materials may also be used. An electric heating element 178 is provided downstream of the mixing section 170 and serves to preheat fuel/steam/air entering the reformer 40 during the warm-up cycle. The heating element 178 may or may not be catalyzed and is energized electrically by conventional means. In one alternative, the electric element is used to complete the vaporization of incoming fuel and/or initiate the reactions. A preferred electric heater 178 comprises an uncatalyzed extruded metal monolith resistance element. Downstream of electric heater 178 is another mixing and distribution foam bed 180. Foam bed 180 serves to further mix the gaseous constituents therein. As per FIG. 2, the diameter of metal housing 158 is enlarged after bed 180. Bed 182 is of media similar to bed 180. Bed 182 has a greater cross sectional area which causes reduced gas velocity. Bed 184 is downstream of bed 182. Bed 184 is also of ceramic foam media, but has a greater number of pores per linear inch, as compared to bed 182. Thus, bed 184 provides a higher velocity profile to act as a flame suppressor. Accordingly, bed 184 prevents ignition and flash back from the downstream POX section.

As per the above, preferred mixing and distribution media comprises ceramic foams having a porosity profile of about 25 pores per linear inch to about 80 pores per linear inch (ppi), but other materials and porosity profiles may be used. A preferred mixingmedia for beds 170, 180 and 182 comprises silicon carbide foam having a preferred porosity profile of about 25 pores per linear inch and a thickness of about one inch. Alternative mixing-media beds include refractory metal foams, ceramic pellets retained in a flow-through container, or a stack of fine (e.g., about 0.001 to about 0.010 openings per inch) metal or ceramic screens, wherein the openings of one screen are offset from the openings in adjacent screens to provide the desired tortuous path. The mixing-media bed 184 can also function as a flame suppressor to prevent any flame from propagating back toward the input end 164, and as a means to distribute the reaction mixture. Thus, bed 184 is near the high end of the 25 to 80 ppi range, and beds 170, 180 and 182 have lesser ppi than bed 184.

The next downstream sections of the autothermal reactor 40 contain the partial oxidation (POX) section 190 steam reformer section 192 which are used to convert hydrocarbons (gasoline) into hydrogen and carbon monoxide as in FIG. 2. A preferred POX catalyst comprises one or more noble metals, Pt, Rh, Pd, Ir, Os, Au, Ru. Other non-noble metals, or combination of metals, such as Ni and Co, are also useable. A noble metal or a non-noble metal is typically used as the steam reforming catalyst. The catalysts are typically supported upon a ceramic material, and supported on a substrate such as a cordierite monolith or Yttria stabilized Zirconia reticulated foam. In the case of a foam, the porosity, in ppi as expressed above, is between 10 and 80 ppi range. The downstream shift reactor 50 typically contains FeO and CuZn catalysts, and the PROX reactor typically contains a noble metal catalyst.

Figure 3:
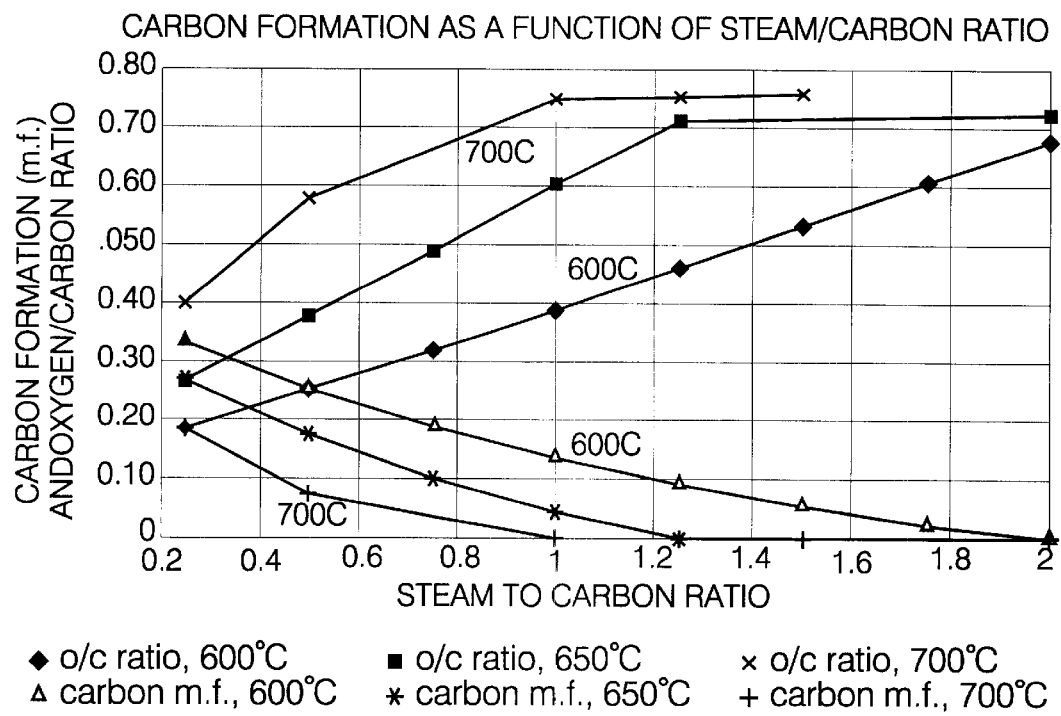
FIG. 3 is a graph which contains plots showing carbon formation as a function of steam/carbon ratio. This demonstrates carbon formation problems occurring with conventional reformer start-up.

The above-described autothermal reactor 40 is used in a mode of operation which avoids carbon formation during processing of hydrocarbon fuels. Carbon formation is a significant difficultly in conventional reformer operations. Carbon formation during steam reforming of higher hydrocarbons (>C6) is generally considered unavoidable. During normal 'steady-state' operation of a conventional partial oxidation/steam reforming reactor the conditions (temperature, stream gas composition) are sought to be maintained so that the tendency to form carbon is reduced. This is very difficult in a rich start-up, and avoiding carbon formation is very difficult and complex controls are needed to minimize carbon formation. A great difficulty in starting a partial oxidation/steam reforming reactor is the inability to preheat the reactor in a reasonably rapid time frame. Thus, during heat up of the steam reforming reactor using a rich start, equilibrium favors carbon formation. FIG. 3 shows equilibrium calculations for carbon formation as a function of temperature and steam/carbon $H_2O:C$ ratio. In FIG. 3, the designation m.f. represents mole fraction. Here, one mole of oxygen is one mole of oxygen atoms. It is clear that at temperatures less than 600° C., a non-zero carbon equilibrium exists for steam/carbon ratios in a given range, thus it is essentially inevitable that as the catalyst heats up from a cold start, carbon formation will occur. After the reactor has been started multiple times, the carbon build-up prevents the reactor from operating effectively, both poisoning the catalyst and decreasing flow.

As shown in FIG. 3, it is essential to start a POX reactor at relatively high oxygen to carbon (O/C) ratios. This results in a relatively high adiabatic temperature rise while avoiding carbon (soot) deposition as the steam to carbon ($H_2O/C$) ratios are relatively lower. It is advantageous to start the POX with high O/C ratio to avoid carbon (soot) formation when little or no water is available. The excess oxygen (relative to stoichiometric) also acts to oxidize any carbon deposits previously formed. As seen in FIG. 3, as the temperature is increased above 700° C., carbon equilibrium reaches essentially zero for steam to carbon ratio greater than one. Note that the steam to carbon ratio is alternatively expressed as $H_2O/C$ or S/C.

Thus, operation of a POX/steam reformer, producing hydrogen as it heats up to normal operating temperature, could produce potentially significant coke (soot) levels. Starting the reactor under conditions closer to stoichiometric conditions (higher O/C) creates a temperature rise too great for the materials typically used in such a reactor (1200° C.). The time required for start-up of a fuel processor for vehicle fuel cell is a problem. Minimizing start-up time is desirable.

The start-up procedure for the partial oxidation/steam reformer (autothermal reformer) of the present invention avoids carbon formation and is appropriate to vehicle driving needs. This start-up strategy incorporates a lean combustion process to start the POX/steam reformer comprised of POX section 190 and reformer section 192. The POX/steam reformer is started lean. Reference to lean indicates that more air is used than is required stoichiometrically. As used here, stoichiometric refers to the amount of oxygen required to oxidize the fuel thereby producing hot gases. Assuming a fuel composition $C_8H_{18}$, the reaction is $C_8H_{18} + 12.5O_2 = 8 CO_2 + 9H_2O$. Here, the stoichiometric oxygen to carbon atomic ratio is O:C of 25:8. A preferred lean start-up mixture has O:C of 10:1. Therefore, considerable excess oxygen and correspondingly excess air (nitrogen plus oxygen) is used. This excess air produces a diluent effect to keep the temperature of the hot gases below a level which would degrade the ceramic and/or catalytic materials. Reference to fuel-rich means that the O:C ratio is less than 25:8. This fuel-rich condition is implemented after fuel lean start-up. Thus, the reaction is above the carbon formation temperature shown in FIG. 3 when rich operation commences.

During start-up, the hot gases heat up the reactor catalyst beds in sections 190 and 192, and simultaneously regenerate the catalyst by oxidizing any residual carbon from prior operation. In one embodiment, after reaching an appropriate temperature throughout the entire catalyst bed (600–700° C.), the combustion is stopped. Next, excess air is purged from the reactor preferably by steam captured from the combustion process. Then, fuel is fed to the reactor followed by appropriate amount of air for rich operation of the reactor. Upon the fuel/water/air mixture reaching the POX catalyst, or an ignition source, ignition provides a rich burn producing hydrogen and CO without significant carbon formation.

More specifically, the invention provides a method for operating the POX/SR to react hydrocarbon with at least one of water and air to produce a product which comprises hydrogen. The invention provides a method for start-up and preheat of the reactor, and then operation of the reactor thereafter to produce the hydrogen-rich product stream. The reactor has a reaction chamber with an inlet and an outlet and one or more catalytic beds. Preferably, there are at least two catalytic beds. The two main reactions, partial oxidation and reforming are described with reference to one or more catalytic beds. This is a design choice. The alternatives include a graded bed, one with graded physical features; or multiple beds of varying configurations to control the reaction profile as desired. Preferably, the first catalytic bed 190 comprises a catalyst supported on a carrier which preferentially catalyzes reaction with oxygen. The second catalytic bed 192 comprises a second catalyst supported on a carrier which preferentially catalyzes reaction with water. The second catalytic bed 192 is arranged downstream with respect to the reactor inlet. In the method, a first stream is provided which comprises a lean fuel and air mixture which flows through the reactor to heat the reactor. The lean mixture contains a sub-stoichiometric amount of fuel relative to oxygen. As a result, there is essentially complete combustion in the first catalytic bed 190 of the reactor and the hot product gases of combustion carry through the second catalytic bed 192 whereby both beds are heated.

Preferably, after the lean burn, a steam purge is conducted. In this alternative, the supply of the lean mixture is terminated and the reactor is purged with steam. Next, the supply of steam is terminated and a second reaction mixture is provided to the reactor which is a fuel-rich mixture. This fuel-rich mixture comprises fuel, air and steam which react within the two catalytic beds to provide the hydrogen-rich product. The rich mixture contains a sub-stoichiometric amount of oxygen relative to the fuel. The process is used on subsequent start-up if needed based on the conditions. If the catalyst bed is warm on a hot restart, the lean combustion would not be needed.

In another alternative, after the supply of the lean mixture and reaction thereof to heat the reactor, the fuel/air ratio is immediately adjusted to provide the fuel-rich mixture accompanied by the supply of steam. In still another alternative, the supply of the lean mixture is terminated, the steam is supplied to purge the reactor, and then the supply of steam is continued while the fuel and air is supplied to provide the fuel-rich mixture.

To initiate the lean burn, it is preferred to start the air supply first, then add fuel to it. To commence fuel-rich operation, it is preferred to start in the following supply sequence, steam, fuel, then air. The order may be selected based on criteria such as process control and catalyst character.

The lean and the rich combustion may occur in a variety of ways on a catalyst, as a flame, or a combination of a flame for lean start-up, and catalyst for rich operation. This allows simple flame ignition, or a catalyst ignition. The catalyst ignition optionally includes a low temperature light-off catalyst or an electrically heated catalyst.

In the lean burn start-up it is possible to control temperature of the reaction by varying air/fuel ratio. As the catalyst downstream of the reaction heats up, carbon will be burned by the excess oxygen in the air, thus regenerating the catalyst bed, and removing any residual carbon. Carbon is oxidized typically at about 500 to about 600° C. Because the lean start has excess oxygen, there will not be carbon formation, because carbon equilibrium formation is zero, even though the catalyst is cold upon start. The reactor heating up under lean mode to the required temperature for rich operation is easier to control and may be faster than if run under a rich mode from the start. This is because under lean start-up, the reactor temperature will be limited only by the total amount of air flow through the reactor catalyst sections. Internal reaction flow (void) volume is defined by the catalyst material contained therein. Under a rich start scenario, the limitation is how much unconverted HC's (hydrocarbons) the rest of the fuel processor 16 can accept.

A lean start of the reactor requires that the catalysts either not be air sensitive, or be able to be re-reduced with full activity after oxidation during lean burn. Preferably, the POX/steam reformer catalysts are noble metal catalysts. Pt/Rh are useable for the POX. Rh has been demonstrated to be an active steam reforming catalyst. The excess oxygen could be fed to the combustor with the POX exhaust and further fuel could be added to the combustor, hence utilizing all of the available oxygen. The result is a reduction in compressor work. This occurs because the partial oxidation is run lean at start-up, so the exhaust contains oxygen as well as combustor by-products. This oxygen from the lean burn reaction in reformer 40 is reusable in the combustor delivered via valve 100.

Figure 4:
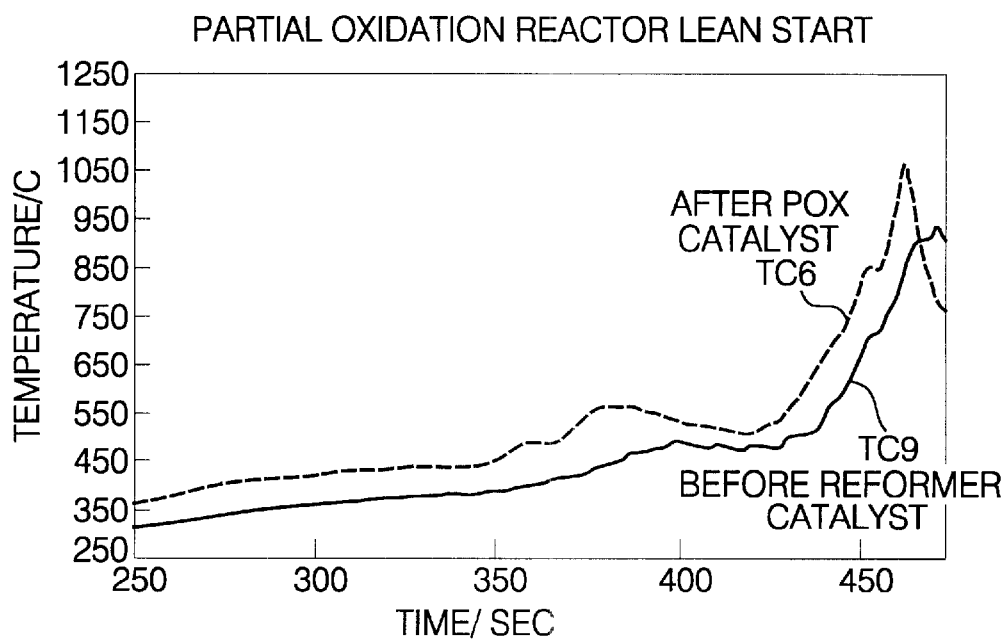
FIG. 4 is a graph containing plots showing the lean start of the partial oxidation reactor section of the autothermal reformer using lean conditions of oxygen to carbon (O:C) mole ratio of 10:1 for preheating the partial oxidation catalyst to a suitable temperature.

FIG. 4 shows a small scale light-off of a POX/steam reformer reactor under lean conditions (O/C=10, power level=1.2 kW) after preheating the partial oxidation catalyst to 350° C. TC6 is a type K thermocouple placed just after the partial oxidation catalyst bed in section 190. The downstream thermocouple TC9 is in the beginning of the steam reforming bed. Thermocouple TC6 is after the POX and TC9 is after reformer inlet mixing distribution foam. FIG. 4 shows the light-off of the POX reaction under lean conditions without using an electric catalyst heater. The graph shows lean ignition combustion from time 250 to time 475 seconds. This graph shows that the process functions properly, but the heat and mass transport were not optimal for this test which was operated under manual control conditions. This test shows the feasibility, and when viewed in the context of FIG. 3, the advantages of the method of the invention.

Figure 5:
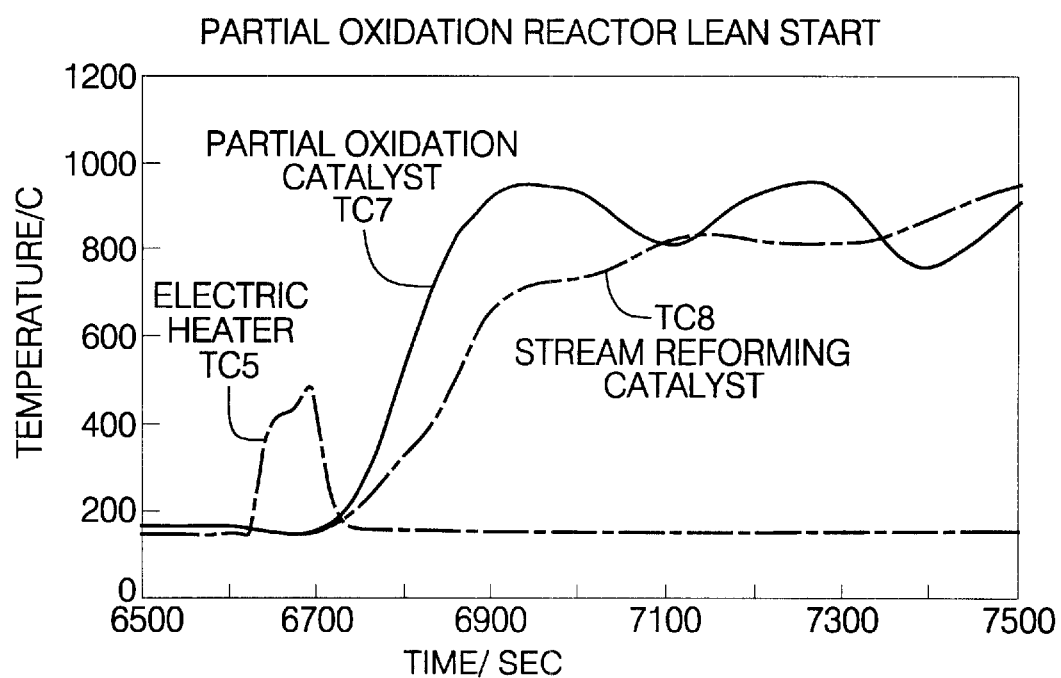
FIG. 5 is a graph which contains plots showing lean start of the partial oxidation reactor using an electric heater to heat inlet gases for the lean start-up (light-off) method of the invention.

FIG. 5 shows a full scale light-off of a POX/steam reformer reactor under lean conditions (O/C=10, power level 6.3 kW). In this case, an electrical heater, similar to electrically heated catalysts developed for catalytic converters, is used to preheat the inlet gases to the POX to initiate light-off of the reactor. This is faster than that shown in FIG. 4. TC5 is a thermocouple just after the electric heater 178. Thermocouple TC7 is in reformer 40 after POX section 190 and thermocouple TC8 is in reforming section 192 of FIG. 2.

FIG. 5 shows that the electric heater is required only for a short time to achieve light-off of the POX catalyst. The light-off time is reduced using the electrically heated catalyst. This also depicts design of the reactor to match the lean combustion space velocity and normal operational parameters of the fuel-rich operating conditions space velocity. This is demonstrated by the stable combustion which occurred for 10 minutes as shown in FIG. 5. The temperature variations are primarily due to the manual control of this example.

Figure 6:
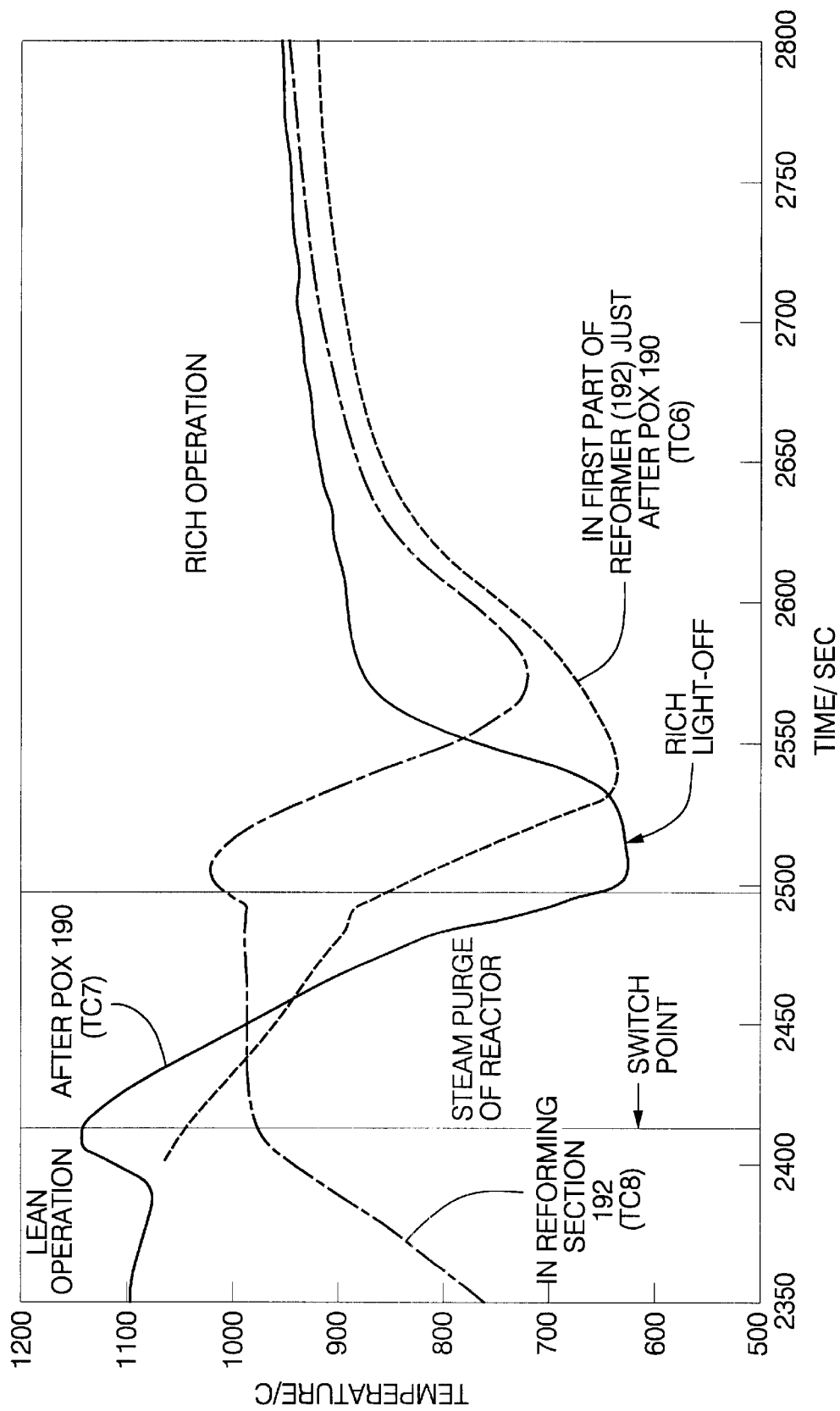
FIG. 6 is a graph containing plots showing operation of the POX from an initial start-up in the fuel lean condition and transitioning to the fuel-rich operation during the normal operating mode of a fuel cell system.

FIG. 6 shows a POX/steam reformer reactor switching from lean operation to rich operation. At time=2410 sec, the fuel is shut off to the reactor, and the temperature of the reactor starts to drop. Air is shut off at 2420 sec, and steam is used to purge the reactor volume of air, starting at t=2420 sec. At t=2490 sec, the fuel and air are again added to the reactor at an O/C of 1.0 to relight the POX. At this point, the POX relights and rises to the normal partial oxidation temperature of about 900° C. FIG. 6 shows the process of an actual lean burn, steam purge, rich burn sequence of operation. Thermocouple TC7 represents the temperature of the POX catalyst where, in lean burn, the combustion is taking place, and the heat of combustion is transported downstream to the reformer, where the temperature is measured with TC6 and TC8. During the steam purge, it is evident that the temperature drops as no reaction is taking place. Since this test was conducted manually, the duration of the steam purge was relatively long. Upon introduction of the fuel and air in addition to the steam, at time 2480 seconds, it is evident that the reaction begins and stabilizes at approximately 900° C. It is evident that the reformer temperatures are close to the POX outlet due to the oxygen to carbon ratio being approximately equal to one, where no steam reforming endotherm is occurring.

The invention provides the advantages of eliminating carbon formation during the start-up period of the POX/SR reactor. An additional benefit is that the catalyst is regenerated every time the reactor is started from a cold start to its steady state operating temperature by means of the lean burn start of the invention. The preheating of the reactor by the method of the invention is preferably combined with a non-reducing/oxidizing steam reforming catalyst such as a precious metal, for example, Rh, Pt. In the alternative, it is adaptable to a reactor designed with temperature control to control a reduced nickel-nickel oxide exotherm. As can be seen, the invention provides the advantage of heating of catalyst beds and timely regeneration of the beds in a reformer, essentially simultaneously. By the method of the invention, the change from the lean condition to the rich condition occurs without the reactor experiencing a fuel/air stoichiometric mixture. Therefore, an advantage is that the POX stays above 600° C. during the purge, thus light-off for the rich mode occurs as soon as the fuel/air mixture of the fuel-rich mode contacts the catalyst. No carbon is deposited in this condition because the temperature is such that carbon formation will be avoided.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. A method for operating an autothermal reformer to reform hydrocarbon fuel to produce a product comprising hydrogen, comprising:
   (a) providing a reactor defining a reaction chamber with an inlet and an outlet and having one or more sequentially arranged catalytic beds comprising a catalyst supported on a carrier which catalyzes reactions within said reactor;
   (b) supplying a first stream comprising a lean hydrocarbon fuel and air mixture to and through said reactor where said lean mixture contains a sub-stoichiometric amount of hydrocarbon fuel relative to oxygen;
   (c) reacting said lean mixture in said reactor to heat said one or more catalytic beds while minimizing formation of carbon;
   (d) supplying a second stream, which includes a hydrocarbon fuel-rich mixture comprising hydrocarbon fuel, air and steam, to and through said reactor wherein said rich mixture contains a sub-stoichiometric amount of oxygen relative to the hydrocarbon fuel;
   (e) reacting said rich mixture in said reactor to produce a product comprising hydrogen ($H_2$).

2. The method of claim 1 which includes between steps (c) and (d), the further step of terminating supply of said lean mixture, and then purging the reactor with steam.

3. The method of claim 2 wherein step (d) is conducted by continuing the supply of said steam and then adding thereto said hydrocarbon fuel and air to provide said second stream hydrocarbon fuel-rich mixture.

4. The method of claim 1 wherein in step (d) further includes adjusting the amount of hydrocarbon fuel and air relative to one another in said first stream and adding steam to the first stream to provide said second stream.

5. The method of claim 1 and further including after step (e), the further steps of terminating supply of said steam in said second stream, and adjusting the amount of hydrocarbon fuel and air relative to one another in said second stream to provide said first stream lean hydrocarbon fuel and air mixture; and repeating steps (b) to (e) in sequence.

6. The method of claim 1 wherein said catalytic beds comprises first and second catalytic beds arranged in sequence between said inlet and said outlet, and step (c) further comprises reacting said hydrocarbon fuel with oxygen in said first catalytic bed to provide hot gases to heat said first catalytic bed and catalytic bed and then flowing said hot gases through said second catalytic bed to heat said second catalytic bed.

7. The method of claim 1 and further comprising after step (e), the further steps of intermittently terminating the supply of said hydrocarbon fuel-rich mixture and then repeating steps (b) to (e) in sequence.

8. The method of claim 1 where before step (b), air is supplied to the reactor, and step (b) is conducted by adding hydrocarbon fuel to said air to form said lean mixture.

9. The method of claim 1 which includes between steps (c) and (d), the further step of terminating supply of said lean mixture; and then supplying steam to the reactor; and step (d) is conducted by supplying steam and then introducing hydrocarbon fuel and then air to form said hydrocarbon fuel-rich mixture.

10. A method for operating an autothermal reformer to reform hydrocarbon to produce a product comprising hydrogen, comprising:
   (a) providing a reactor defining a reaction chamber with an inlet and an outlet and at least two catalytic beds, with one catalytic bed comprising a catalyst supported on a carrier which preferentially catalyzes reaction with oxygen and another catalytic bed comprising another catalyst supported on a carrier which preferentially catalyzes reaction with water;
   (b) supplying a first stream comprising a lean hydrocarbon fuel and air mixture to and through said reactor where said lean mixture contains a sub-stoichiometric amount of hydrocarbon fuel relative to oxygen;
   (c) reacting said lean mixture in said reactor to heat said beds;
   (d) supplying a second stream, which includes a hydrocarbon fuel-rich mixture comprising hydrocarbon fuel, air and steam, to and through said reactor wherein said rich mixture contains a sub-stoichiometric amount of oxygen relative to the hydrocarbon fuel;
   (e) reacting said rich mixture in said reactor to produce a product comprising hydrogen ($H_2$).

* * * * *